(12) United States Patent
Philipp

(10) Patent No.: US 9,272,932 B2
(45) Date of Patent: Mar. 1, 2016

(54) METHOD FOR BREAKDOWN OF TOXIC ORGANIC COMPOUNDS CONTAINED IN WASTEWATERS AND/OR WASTE GASES

(71) Applicant: Commerzialbank Mattersburg Im Burgenland Aktiengesellschaft, Mattersburg (AT)

(72) Inventor: Franz Josef Philipp, Forchtenstein (AT)

(73) Assignee: COMMERZIALBANK MATTERSBURG IM BURGENLAND AKTIENGESELLSCHAFT, Mattersburg (AT)

( * ) Notice: Subject to any disclaimer, the term of this patent is extended or adjusted under 35 U.S.C. 154(b) by 8 days.

(21) Appl. No.: 14/379,561

(22) PCT Filed: Feb. 14, 2013

(86) PCT No.: PCT/AT2013/050038
§ 371 (c)(1),
(2) Date: Aug. 19, 2014

(87) PCT Pub. No.: WO2013/123540
PCT Pub. Date: Aug. 29, 2013

(65) Prior Publication Data
US 2015/0299011 A1    Oct. 22, 2015

(30) Foreign Application Priority Data

Feb. 20, 2012  (AT) .................................. A 205/2012

(51) Int. Cl.

| | | |
|---|---|---|
| *A62D 3/30* | (2007.01) | |
| *C02F 3/32* | (2006.01) | |
| *B01J 20/22* | (2006.01) | |
| *B01D 53/70* | (2006.01) | |
| *B01D 53/73* | (2006.01) | |
| *B01D 53/78* | (2006.01) | |
| *C02F 1/66* | (2006.01) | |
| *B01J 20/12* | (2006.01) | |
| *B01J 20/04* | (2006.01) | |
| *B01J 20/28* | (2006.01) | |
| *C02F 1/70* | (2006.01) | |
| *C02F 1/28* | (2006.01) | |
| *C02F 101/36* | (2006.01) | |
| *C02F 1/52* | (2006.01) | |
| *C02F 101/30* | (2006.01) | |
| *C02F 101/32* | (2006.01) | |

(52) U.S. Cl.
CPC . *C02F 3/32* (2013.01); *B01D 53/70* (2013.01); *B01D 53/73* (2013.01); *B01D 53/78* (2013.01); *B01J 20/043* (2013.01); *B01J 20/12* (2013.01); *B01J 20/22* (2013.01); *B01J 20/28004* (2013.01); *C02F 1/288* (2013.01); *C02F 1/66* (2013.01); *C02F 1/70* (2013.01); *B01D 2257/2064* (2013.01); *B01J 2220/46* (2013.01); *B01J 2220/485* (2013.01); *C02F 1/281* (2013.01); *C02F 1/286* (2013.01); *C02F 1/529* (2013.01); *C02F 2101/30* (2013.01); *C02F 2101/305* (2013.01); *C02F 2101/32* (2013.01); *C02F 2101/36* (2013.01); *C02F 2101/366* (2013.01); *C02F 2301/063* (2013.01); *C02F 2303/02* (2013.01); *C02F 2303/16* (2013.01)

(58) Field of Classification Search
CPC ....................................................... A62D 3/30
USPC ............................................................ 588/313
See application file for complete search history.

(56) References Cited

FOREIGN PATENT DOCUMENTS

| | | | |
|---|---|---|---|
| DE | 197 45 191 A1 | 4/1999 | |
| DE | 198 59 443 A1 | 6/2000 | |
| FR | 2 720 010 A1 | 11/1995 | |
| WO | WO 2008/095714 A1 | 8/2008 | |

*Primary Examiner* — Edward Johnson
(74) *Attorney, Agent, or Firm* — Lucas & Mercanti, LLP; Jonathan Myers

(57) ABSTRACT

A method is disclosed for breaking down toxic organic compounds contained in wastewaters and/or waste gases, in which the wastewaters and/or waste gases loaded with toxic organic compounds are first passed into an aqueous basic alkali/alkaline earth solution/suspension bath for destabilization of the toxic organic compounds and then the solution/suspension bath containing the destabilized toxic organic compounds is fed in ascending fashion into a capillary mass arranged above the bath, consisting of a mixture of pulps and peat mixed with bentonite, zeolite and/or lime with a particle size <200 μm.

17 Claims, 1 Drawing Sheet

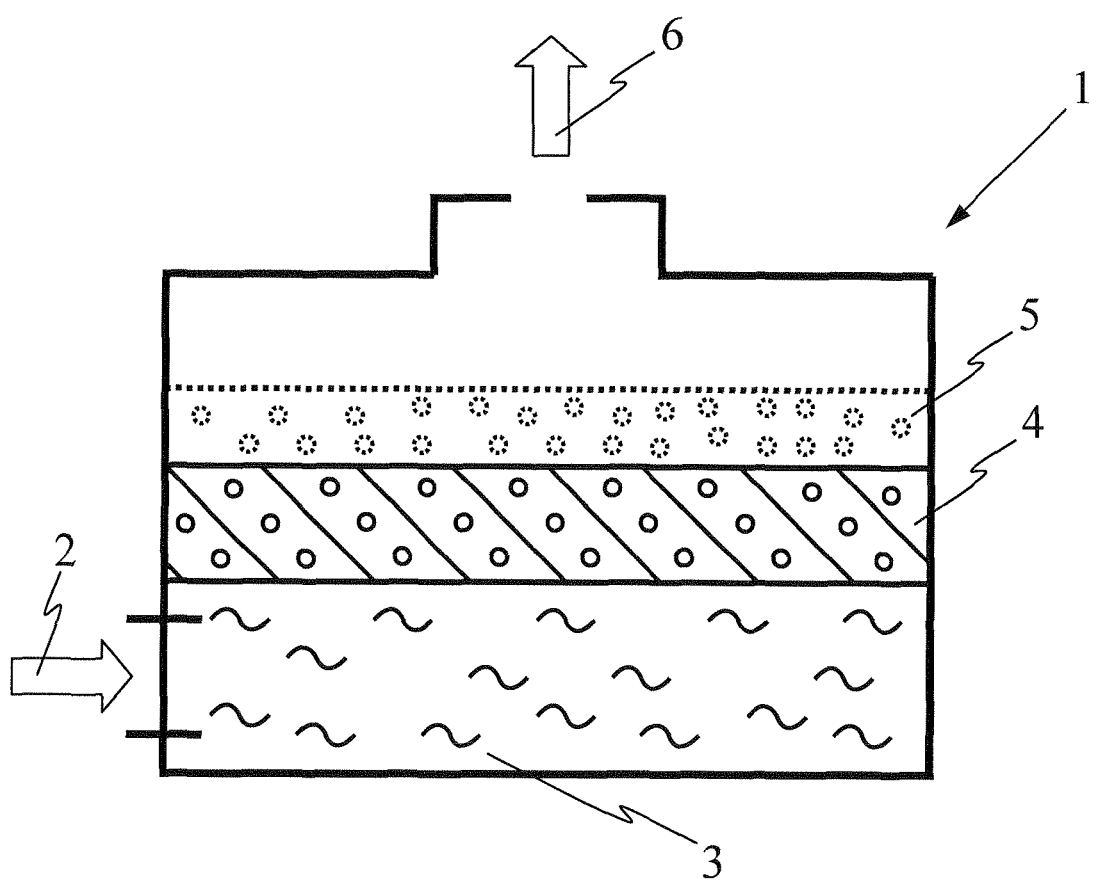

METHOD FOR BREAKDOWN OF TOXIC ORGANIC COMPOUNDS CONTAINED IN WASTEWATERS AND/OR WASTE GASES

CROSS REFERENCE TO RELATED APPLICATION

This Application is a 371 of PCT/AT2013/050038 filed on Feb. 14, 2013 which, in turn, claimed the priority of Austrian Patent Application No. A 205/2012 filed on Feb. 20, 2012 both applications are incorporated herein by reference.

FIELD OF THE INVENTION

This invention concerns a method for breaking down (decomposing) toxic organic compounds contained in wastewaters and/or waste gases. Such toxic organic compounds for example, include dioxins and furans.

BACKGROUND OF THE INVENTION

Biofilters which are used to purify and control the odor of wastewaters and waste gases, are known from the generally known prior art. Such biofilters include a filter layer and an air distribution chamber into which a steam-saturated crude gas is introduced. Different composts such as; bark compost, green compost, ground root wood, chopped wood bark, peat, coconut fibers, etc. as well as mixtures of these materials can be used as traversed filter material. A combination of this type of biofilter with an upstream biowasher is also known in the filtering processes.

Highly toxic organic compounds, dioxins and furans which are contained in waste gases, incineration gases, industrial exhaust, etc., pose greater problems. During disposal or purification of such waste gases, specially developed, expensive high-tech equipment is required.

Object of the Invention

In this respect one task of the invention is to devise a simple and inexpensive method for breaking down toxic organic compounds contained in wastewaters and/or waste gases in order not to further load the environment with organic compounds like dioxins and furans, which are highly toxic even at low concentrations.

SUMMARY OF THE INVENTION

This task is solved according to the invention, in that the wastewaters and/or waste gases loaded with toxic organic compounds are first fed into an aqueous, basic, alkaline/alkaline earth solution/suspension bath for destabilization of the toxic organic compounds, and in that, the solution/suspension bath containing the destabilized toxic organic compounds is then passed in an ascending fashion to a capillary mass arranged above it, formed from a mixture of processed wood pulp and peat mixed with bentonite, zeolite and/or lime with a particle size <200 µm.

The toxic organic compounds are then split or broken down in a simple and advantageous manner and decomposed to environmentally safe compounds, which can be taken off together with the gaseous and/or liquid, possibly reusable end products that form according to the process or directly released to the atmosphere.

In a preferred variant of this method according to the invention, a peat layer is arranged above the capillary mass. This expedient is mostly conducted for safety reasons in order to ensure that toxic organic compounds are no longer found in the end products according to the method.

According to another feature of the method according to the invention refiner pulps are used as processed wood pulps in the capillary mass. These consist of mechanically produced primary fibrous substances, in which case wood chips or ground wood can also be used as a substitute.

Wood chips are ordinary used as starting material to produce refiner wood pulps, in which different methods can be used for processing, like the defibrator method. The defibrator method is a thermo-mechanical processing operation in which the wood chips are first preheated and softened in a preheater with hot steam and then ground to fibers in a grinder. Such refiner pulps are ordinarily used in the production of MDF boards (medium-density fiberboard).

One feature of the method according to the invention consists of an aqueous homogeneous solution/suspension of calcium sulfate basified with calcium hydroxide is used as solution/suspension bath. A gypsum solution/suspension with lime is preferably used, in which case it is essential that the entire solution/suspension be present in uniformly homogenized form. The solution/suspension bath, however, can also be any readily available alkali salt and/or other alkaline earth salt solution/suspension, which is basified with corresponding alkali or other alkaline earth compounds.

According to another feature of this method of the invention, the alkali/alkaline earth solution/suspension bath is set at a pH value between 8 and 11, preferably between 8 and 9.

The process temperature over all process steps is 1 to 25° C. according to the invention, preferably 3 to 4° C. According to another feature the method according to the invention is run in all process steps at a partial vacuum of 0.2 to 0.8 bar, preferably 0.5 bar.

BRIEF DESCRIPTION OF THE DRAWING

The method according to the invention is explained below with reference to the FIGURE in the drawing, which depicts a schematic arrangement for breakdown of toxic organic compounds contained in wastewaters and/or waste gases for performance of the method according to the invention.

DETAILED DESCRIPTION OF THE DRAWING

A processing tank 1 is filled in a lower area with an aqueous, basic alkali/alkaline earth solution/suspension bath 3, which is supplied with wastewaters and/or waste gases 2 loaded with toxic organic compounds. This solution/suspension bath 3 is appropriately formed from a homogeneous aqueous calcium sulfate solution/suspension, preferably gypsum solution/suspension, which is mixed with a solution/suspension of calcium hydroxide (lime) for basification. The solution/suspension bath 3 is then set to a pH value between 8 and 11, the preferred pH range lying between 8 and 9. In this basic medium the toxic organic compounds supplied by the introduced wastewaters or waste gases 2 are destabilized in the solution/suspension bath 3.

A capillary mass 4 formed from a mixture of wood pulps, preferably refiner pulps, and peat is arranged adjacent to and above the solution/suspension bath 3, which is mixed in a limited fraction with bentonite, zeolite and/or lime with a particle size <200 µm, referred to the entire capillary mass. The pulp is preferably mixed with finely divided bentonite, zeolite and/or lime. Finely divided plastics, mixed plastics and plastic compounds can also be added to the capillary mass. Solution/suspension is continuously absorbed from the solution/suspension bath 3 by the capillary mass 4 mostly via capillary forces and passed through the capillary mass 4. The destabilized toxic compounds are split or degraded in the context of a chemical/physical process and broken down into individual harmless compounds. The method is run at a process temperature from 1 to 25° C., preferably 3 to 4° C. over all process steps and at a partial vacuum from 0.2 to 0.8 bar, preferably 0.5 bar also in all process steps.

The capillary mass 4 is advantageously covered as a safety factor, with a pure peat layer 5 (shown with a dashed line) in order to reliably guarantee that all the toxic organic compounds are actually split or broken down to harmless compounds.

The decomposed environmentally safe compounds can then be taken off together with the gaseous and/or liquid, possibly reusable end products 6 that form according to the process or directly released to the atmosphere.

With respect to performance of the method according to the invention it is found that the individual components of the materials being used, as well as the medium present in the corresponding process stages are monitored and controlled by continuous measurements during the entire process, in which case, depending on the requirements or as a function of the measurement results, material feed or withdrawal is controllable. This expedient can at least serve to support continuous performance of the process.

However, in order to effectively guarantee continuous performance of the method according to the invention two or more processing tanks are connected in parallel. The individual sections in the processing tank operate similar to filter boxes, in which these are switched as a function of continuously occurring monitoring measurements before or on achievement of established measurement limit values or during corresponding saturation, i.e., the processing tank in operation is switched off and at least one parallel-connected tank is engaged. In the disconnection phase the materials used in the individual process sections are replaced or regenerated so that at least one processing tank is always available in the sense of a continuous process for performance of the method for breaking down of the toxic organic compounds contained in wastewater and/or waste gases.

The method according to the invention is further described below by means a preferred variant.

A lower chamber of a processing tank is filled with a solution/suspension bath, which consists of a homogenized aqueous solution of calcium hydroxide in which finely ground lime and gypsum are suspended. The pH value of the solution/suspension bath is initially set at pH 9-10. The waste gas formed in an incineration process of organic material loaded with toxic organic compounds, like chlorinated hydrocarbons, dioxins and/or furans is introduced to this solution/suspension bath by means of a compressor under a pressure between 7 and 12 bar. The chamber filled with the solution/suspension bath is kept under a pressure between 6 and 12 bar by means of the compressor.

During continuous introduction of the waste gas the pH value of the bath diminishes, in which case gypsum is formed from the calcium hydroxide solution and the lime. As a function of continuous pH value measurement formed gypsum is taken off, on the one hand, and calcium hydroxide and lime added as required, on the other.

The toxic organic compounds contained in the waste gas are destabilized in the basic aqueous medium in the bath chamber, in which sufficient residence time of the waste gas in the solution/suspension bath is an essential criterion.

Liquid medium is drawn from the bath chamber into a chamber arranged above it by a partial vacuum of 0.5 to 0.8 bar generated by a pump arranged at the upper output from the processing tank, in which the pressure gradient built up in the processing tank guarantees sufficient residence time of the waste gas in the solution/suspension bath.

The chamber arranged above it is filled with a capillary mass, which is formed from refiner pulps. If available, other fiber material like; paper hemp, flax, cotton, cellulose, plastics, mixed plastics, in each case they are separated into fibers or finely divided. To increase the surface area, biocarbon, if available, mixed with metal compounds, are added in an amount of <1 wt % referred to the capillary mass.

The toxic organic compounds destabilized with the capillary mass in the bath chamber arranged below are split and broken down to components that no longer burden the environment.

A layer containing peat-is also arranged above the chamber containing the capillary mass, which has a peat fraction ≤5 wt %, if available 3 wt %, with a moisture content of 80% referred to dry mass. This peat-containing layer is not absolutely necessary according to the process, but serves merely for safety reasons in order to make any toxic compounds still contained in the withdrawn liquid medium harmless by decomposition.

The process temperature over all process stages is preferably 3-4° C.

Measurement with respect to individual components of the waste gas stream at the input to the processing system, referred to as "crude gas", and the gas stream at the output from the processing system, referred to as "clean gas", are carried out together with this process. The determined measurement results are apparent from the following Tables 1 to 3 [sic].

The concentration of polychlorinated dibenzo-p-dioxins and dibenzofurans are shown in Table 1. The results include the total content of 2,3,7,8-substituted PCDD and PCDF and calculation of the 2,3,7,8-TCDD toxicity equivalents according to the I-TEF model.

By summing the detection limit concentrations of all 17 congeners considered in the I-TEF model and weighting with the corresponding equivalence factors the toxicity-equivalent limit concentration is determined. This limit concentration states the theoretically maximum possible toxicity equivalent value for a case in which the 17 toxic PCDD/PCDF congeners contained in the model would be present precisely with the detection limit concentrations. For the measurements in question toxicity-equivalent limit concentrations for PCDD and PCDF of 0.00004 ng/Nm$^3$ (crude gas) and 0.0005 ng/Nm$^3$ (clean gas) are obtained.

It is pointed out that the toxic 1,2,3,7,8-P5CDF cannot be separated chromatographically from 1,2,3,4,8-P5CDF. The same applies for the compounds 1,2,3,4,7,8-H6CDF and 1,2,3,4,7,9-H6CDF. This means that the results lie on the safe side.

TABLE 1

Results of PCDD/PCDF measurements

| | Polychlorinated dibenzodioxins and dibenzofurans | | | |
|---|---|---|---|---|
| | Crude gas | | Clean gas | |
| Parameter | [ng/Nm$^3$] | I-TEF [ngTE/Nm$^3$] | [ng/Nm$^3$] | I-TEF [ngTE/Nm$^3$] |
| 2,3,7,8-T4CDD | 0.0018 | 0.00179 | 0.0001 | 0.00005 |
| 1,2,3,7,8-P5CDD | 0.0012 | 0.00060 | 0.0002 | 0.00011 |
| 1,2,3,4,7,8-H6CDD | 0.0005 | 0.00005 | 0.0003 | 0.00003 |
| 1,2,3,6,7,8-H6CDD | 0.0008 | 0.00008 | 0.0007 | 0.00007 |

TABLE 1-continued

Results of PCDD/PCDF measurements

| | Polychlorinated dibenzodioxins and dibenzofurans | | | |
|---|---|---|---|---|
| | Crude gas | | Clean gas | |
| Parameter | [ng/Nm$^3$] | I-TEF [ngTE/Nm$^3$] | [ng/Nm$^3$] | I-TEF [ngTE/Nm$^3$] |
| 12,3,7,8,9-H6CDD | 0.0020 | 0.00020 | 0.0006 | 0.00006 |
| 1,2,3,4,6,7,8-H7CDD | 0.0027 | 0.00003 | 0.0051 | 0.00005 |
| O8CDD | 0.0034 | 0.000003 | 0.0045 | 0.000005 |
| 2,3,7,8-PCDD | 0.0124 | 0.0027 | 0.0115 | 0.0004 |
| 2,3,7,8-T4CDF | 0.0236 | 0.00236 | 0.0010 | 0.00010 |
| 1,2,3,7,8-P5CDF[a] | 0.0073 | 0.00037 | 0.0010 | 0.00005 |
| 2,3,4,7,8-P5CDF | 0.0209 | 0.0104 | 0.0018 | 0.00091 |
| 1,2,3,4,7,8-H6CDF[b] | 0.0039 | 0.00039 | 0.0020 | 0.00020 |
| 1,2,3,6,7,8-H6CDF | 0.0037 | 0.00037 | 0.0020 | 0.00020 |
| 12,3,7,8,9-H6CDF | 0.0009 | 0.00009 | 0.0007 | 0.00007 |
| 2,3,4,6,7,8-H6CDF | 0.0054 | 0.00054 | 0.0020 | 0.00020 |
| 1,2,3,4,6,7,8-H7CDF | 0.0067 | 0.00007 | 0.0109 | 0.00011 |
| 1,2,3,4,7,8,9-H7CDF | 0.0011 | 0.00001 | 0.0017 | 0.00002 |
| O8CDF | 0.0024 | 0.000002 | 0.0069 | 0.000007 |
| 2,3,7,8-PCDF | 0.076 | 0.0146 | 0.030 | 0.0019 |
| 2,3,7,8-PCDD + PCDF | 0.088 | 0.0174 | 0.042 | 0.0023 |

The crude gas concentrations are referred to standard conditions (0° C., 1013 hPa) and dry waste gas
[a] not separated from 1,2,3,4,8-P5CDF
[b] not separated from 1,2,3,4,7,9-H6CDF The flue gas concentrations of polycyclic aromatic hydrocarbons (PAH) are shown in Table 2. The results include the individual values, the total content of 16 PAH according to EPA and the content according to DIN 38409 H 13 (six compounds). The detection limits of the PAH lie in the range of 0.0001 µg/Nm$^3$.

TABLE 2

Results of PAH measurements

| | Polycyclic aromatic hydrocarbons | |
|---|---|---|
| Parameter | Crude gas [µg/Nm$^3$] | Clean gas [µg/Nm$^3$] |
| Naphthalene | 139 | 0.79 |
| Acenaphthylene | 27 | 0.052 |
| Acenaphtene | 1.1 | 0.011 |
| Fluorene | 4.4 | 0.046 |
| Phenanthrene | 27 | 0.40 |
| Anthracene | 2.0 | 0.012 |
| Fluoranthene | 5.8 | 0.084 |
| Pyrene | 5.3 | 0.071 |
| Benz(a)anthracene | 0.56 | 0.007 |
| Chrysene | 0.95 | 0.011 |
| Benzo(b)fluoranthene | 0.69 | 0.0051 |
| Benzo(k)fluoranthene | 0.18 | 0.0011 |
| Benzo(a)pyrene | 0.26 | 0.0013 |
| Indeno(1,2,3-c,d)pyrene | 0.31 | 0.0031 |
| Benzo(ghi)perylene | 0.37 | 0.0024 |
| Dibenz(ac,ah)anthracene | 0.042 | 0.0002 |
| PAH (EPA)[a] | 215 | 1.5 |
| PAH (DIN 38409 H13)[b] | 7.6 | 0.10 |

The crude gas concentrations are referred to standard conditions (0° C., 1013 hPa) and dry waste gas.
[a] PAH (EPA) sum of 16 investigated polycyclic aromatic hydrocarbons
[b] PAH (DIN 38409 H 13) sum of the following six polycyclic aromatic hydrocarbons: fluoranthene ($C_{16}H_{10}$), benzo(a)pyrene ($C_{20}H_{12}$), benzo(b)fluoranthene ($C_{20}H_{12}$), benzo(k)fluoranthene ($C_{20}H_{12}$), benzo(g,h,i)perylene ($C_{22}H_{12}$), indeno(1,2,3-c,d)pyrene ($C_{22}H_{12}$)

The present measurement results show that much lower values are found in the clean gas at the output from the processing system than in the rude gas at the input to the processing system. A distortion of the clean gas values by backflowing flue gas from the area of connection of the clean gas line to the stack also appears to be probable.

The invention claimed is:

1. A method of breaking down a toxic organic compound contained in a waste water or a waste gas, which comprises the steps of:
   a) feeding the waste water or the waste gas containing the toxic organic compound into an aqueous, basic bath containing a solution or a suspension of an alkali metal or alkaline earth metal to destabilize the toxic organic compound;
   b) introducing the bath containing the solution or suspension of the destabilized toxic organic compound in ascending fashion into a capillary mass arranged above the bath, in which the capillary mass comprises a processed pulp and peat mixed with bentonite, zeolite, lime or mixtures thereof wherein the entire capillary mass has a particle size of <200 microns; and
   c) splitting or degrading the destabilized toxic organic compound in the capillary mass to break down the destabilized toxic organic compound into individual harmless compounds.

2. The method defined in claim 1 further comprising the step of:
   d) arranging a peat layer above the capillary mass, through which the broken down destabilized compounds leaving the capillary mass pass, to reliably guarantee that all of the toxic organic compound is actually split or broken down into harmless compounds according to step c).

3. The method defined in claim 1 wherein according to step b), the processed pulp in the capillary mass is a refiner pulp.

4. The method defined in claim 1 wherein according to step b) the bentonite, zeolite, and or lime contained in the capillary mass is 0.3 to 5%.

5. The method defined in claim 4 wherein the bentonite, zeolite, and or lime contained in the capillary mass is 0.5 to 1%.

6. The method defined in claim 1 wherein according to step a) an aqueous homogeneous calcium sulfate solution basified with calcium hydroxide is used as the solution of the alkaline earth metal.

7. The method defined in claim 1 wherein according to step (a) the aqueous, basic bath containing a solution or a suspension of an alkali metal or alkaline earth metal has a pH value between 8 and 11.

8. The method defined in claim 7 wherein the aqueous, basic bath containing a solution or a suspension of an alkali metal or alkaline earth metal has a pH value between 8 and 9.

9. The method defined in claim 6 wherein the aqueous homogeneous calcium sulfate solution basified with calcium hydroxide has a pH value between 8 and 11.

10. The method defined in claim 9 wherein the aqueous homogeneous calcium sulfate solution basified with calcium hydroxide has a pH value between 8 and 9.

11. The method defined in claim 1 wherein process temperature over all process stages is 1 to 25° C.

12. The method defined in claim 11 wherein process temperature over all process stages is 3 to 4° C.

13. The method defined in claim 1 wherein all process stages are run at a partial vacuum from 0.2 to 0.8 bar.

14. The method defined in claim 13 wherein all process stages are run at a partial vacuum of 0.5 bar.

15. The method defined in claim 1 wherein the toxic organic compound is a chlorinated hydrocarbon, a chlorinated dioxin, a chlorinated furan, or a polycyclic aromatic hydrocarbon.

16. The method defined in claim 15 wherein the chlorinated dioxin is a polychlorinated dibenzo-p-dioxin.

17. The method defined in claim 15 wherein the chlorinated furan is a polychlorinated dibenzofuran.

* * * * *